United States Patent
Agarwal et al.

(10) Patent No.: US 11,979,476 B2
(45) Date of Patent: May 7, 2024

(54) HIGH PERFORMANCE CONNECTION SCHEDULER

(71) Applicant: Google LLC, Mountain View, CA (US)

(72) Inventors: Abhishek Agarwal, Santa Clara, CA (US); Weihuang Wang, Los Gatos, CA (US); Weiwei Jiang, Santa Clara, CA (US); Srinivas Vaduvatha, San Jose, CA (US); Jiazhen Zheng, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/961,669

(22) Filed: Oct. 7, 2022

(65) Prior Publication Data

US 2024/0121320 A1    Apr. 11, 2024

(51) Int. Cl.
*H04L 67/61* (2022.01)
*H04L 67/55* (2022.01)

(52) U.S. Cl.
CPC .............. *H04L 67/61* (2022.05); *H04L 67/55* (2022.05)

(58) Field of Classification Search
CPC .................................. H04L 67/61; H04L 67/55
See application file for complete search history.

(56) References Cited

U.S. PATENT DOCUMENTS

| | | | |
|---|---|---|---|
| 6,680,933 B1 * | 1/2004 | Cheesman | H04Q 11/0478 370/395.43 |
| 8,665,724 B2 | 3/2014 | Stanwood et al. | |
| 8,780,722 B2 * | 7/2014 | Masputra | H04L 47/60 370/235 |
| 9,042,398 B2 | 5/2015 | Lee | |
| 9,386,597 B2 | 7/2016 | Westberg et al. | |
| 9,628,398 B1 | 4/2017 | Malchi et al. | |
| 10,243,866 B2 | 3/2019 | Benjamini et al. | |
| 10,291,416 B2 | 5/2019 | Law et al. | |
| 10,324,755 B2 | 6/2019 | Hirsch | |
| 10,567,221 B2 | 2/2020 | Law et al. | |
| 11,711,311 B2 * | 7/2023 | Wang | H04L 47/12 370/230 |
| 2005/0175014 A1 | 8/2005 | Patrick | |
| 2012/0163396 A1 * | 6/2012 | Cheng | H04L 49/9047 370/412 |
| 2013/0201825 A1 | 8/2013 | Masputra et al. | |
| 2013/0201996 A1 * | 8/2013 | Masputra | H04L 47/60 370/412 |
| 2015/0236966 A1 * | 8/2015 | Francini | H04L 43/16 370/235 |
| 2018/0091278 A1 * | 3/2018 | Kanamarlapudi | H04W 28/0273 |
| 2019/0369991 A1 * | 12/2019 | Sobel | G06F 9/3836 |
| 2020/0374216 A1 * | 11/2020 | Ganesh | H04L 69/14 |

(Continued)

OTHER PUBLICATIONS

Extended European Search Report for European Patent Application No. 23163776.0 dated Sep. 12, 2023. 13 pages.

*Primary Examiner* — Dhairya A Patel
(74) *Attorney, Agent, or Firm* — Lerner David LLP (57) ABSTRACT

Aspects of the disclosure are directed to a high performance connection scheduler for reliable transport protocols in data center networking. The connection scheduler can handle enqueue events, dequeue events, and update events. The connection scheduler can include a connection queue, scheduling queue, and quality of service arbiter to support scheduling a large number of connections at a high rate.

20 Claims, 6 Drawing Sheets

(56) References Cited

U.S. PATENT DOCUMENTS

| | | | |
|---|---|---|---|
| 2021/0075734 A1 | 3/2021 | Lin et al. | |
| 2021/0185139 A1* | 6/2021 | Wang | H04L 67/55 |
| 2021/0399990 A1* | 12/2021 | Wang | H04L 47/12 |
| 2023/0127722 A1* | 4/2023 | Ibanez | G06F 9/5016 |
| | | | 719/318 |
| 2023/0300187 A1* | 9/2023 | Ellappan | H04L 67/10 |
| | | | 709/226 |
| 2023/0403533 A1* | 12/2023 | Edge | H04W 64/00 |

* cited by examiner

HIGH PERFORMANCE CONNECTION SCHEDULER

BACKGROUND

Reliable transport protocol can support a large number of connections, which can include both initiated requests as well as received requests. The large number of connections can be subject to ordering requirements and gating requirements. Determining how to queue the large number of connections while factoring in the ordering requirements and gating requirements can slow down performance and increase latency of receiving data packets, transmitting data packets, and/or updating data packets.

BRIEF SUMMARY

Aspects of the disclosure are directed to a high performance connection scheduler for reliable transport protocols in data center networking. The connection scheduler can include a connection queue, scheduling queue, and quality of service arbiter to support scheduling a large number of connections at a high rate. The connection scheduler can further include eligibility and solicitation checks when scheduling the connections. The connection scheduler can handle enqueue events for receiving data packets, dequeue events for transmitting data packets, and update events for modifying data packets.

Aspects of the disclosure provide for a method for scheduling connections related to data packets. The method includes: performing, with the one or more processors, an eligibility check on a connection, the eligibility check including determining the connection is within congestion windows based on a transaction type of the connection; queueing, with the one or more processors, the connection in a scheduling queue of a plurality of scheduling queues based on the transaction type in response to the connection passing the eligibility check; selecting, with the one or more processors, the connection from the scheduling queue based on a quality of service (QoS) arbiter decision; and queueing, with one or more processors, the connection in a connection queue of a plurality of connection queues based on the transaction type of the connection.

In an example, the scheduling queues and the connection queues each include a plurality of linked lists. In another example, the plurality of linked lists of the scheduling queues and the plurality of linked lists of the connection queues each include linked lists for at least one of push requests, unordered push requests, push grants, push data, or pull data transaction types.

In yet another example, the congestion windows include a network congestion window and an end-node congestion window. In yet another example, passing the eligibility check includes determining a number of outstanding requests is less than the end-node congestion window. In yet another example, passing the eligibility check comprises determining a packet sequence number is less than a base sequence number plus the network congestion window.

In yet another example, the method further includes performing, with the one or more processors, a solicitation check on the connection, the solicitation check including determining an inflight count based on the connection is within a solicitation window. In yet another example, passing the solicitation check further includes determining a rate counter is greater than 0.

In yet another example, selecting the connection from the scheduling queue further includes selecting the scheduling queue based on at least one of a priority level or a weight of the scheduling queue. In yet another example, selecting the connection from the scheduling queue is based on a weight of the connection.

Another aspect of the disclosure provides for a system including: one or more processors; and one or more storage devices coupled to the one or more processors and storing instructions that, when executed by the one or more processors, cause the one or more processors to perform operations for scheduling connections related to data packets. The operations include: performing an eligibility check on a connection, the eligibility check including determining the connection is within congestion windows based on a transaction type of the connection; queueing the connection in a scheduling queue of a plurality of scheduling queues based on the transaction type in response to the connection passing the eligibility check; selecting the connection from the scheduling queue based on a quality of service (QoS) arbiter decision; and queueing the connection in a connection queue of a plurality of connection queues based on the transaction type of the connection.

In an example, the scheduling queues and the connection queues each include a plurality of linked lists. In another example, the congestion windows include a network congestion window and an end-node congestion window; passing the eligibility check includes determining a number of outstanding requests is less than the end-node congestion window; and passing the eligibility check includes determining a packet sequence number is less than a base sequence number plus the network congestion window. In yet another example, the operations further include performing a solicitation check on the connection, the solicitation check including determining an inflight count based on the connection is within a solicitation window. In yet another example, selecting the connection from the scheduling queue is based on a weight of the connection and further includes selecting the scheduling queue based on at least one of a priority level or a weight of the scheduling queue.

Yet another aspect of the disclosure provides for a non-transitory computer readable medium for storing instructions that, when executed by one or more processors, cause the one or more processors to perform operations for scheduling connections related to data packets. The operations include: performing an eligibility check on a connection, the eligibility check including determining the connection is within congestion windows based on a transaction type of the connection; queueing the connection in a scheduling queue of a plurality of scheduling queues based on the transaction type in response to the connection passing the eligibility check; selecting the connection from the scheduling queue based on a quality of service (QoS) arbiter decision; and queueing the connection in a connection queue of a plurality of connection queues based on the transaction type of the connection.

In an example, the scheduling queues and the connection queues each include a plurality of linked lists. In another example, the congestion windows include a network congestion window and an end-node congestion window; passing the eligibility check includes determining a number of outstanding requests is less than the end-node congestion window; and passing the eligibility check includes determining a packet sequence number is less than a base sequence number plus the network congestion window. In yet another example, the operations further include performing a solicitation check on the connection, the solicitation check including determining an inflight count based on the connection is within a solicitation window. In yet another example, selecting the connection from the scheduling queue is based on a weight of the connection and further includes selecting the scheduling queue based on at least one of a priority level or a weight of the scheduling queue.

DETAILED DESCRIPTION

Generally disclosed herein are implementations for a high performance connection scheduler for reliable transport protocols in data center networking. The connection scheduler can support scheduling a large number of connections at a high rate.

The connection scheduler can handle three types of events: an enqueue event, a dequeue event, and an update event. An enqueue event can correspond to the connection scheduler receiving a new data packet to be queued for transmission. A dequeue event can correspond to a queued data packet being removed from the queue to be scheduled for transmission. An update event can correspond to the connection scheduler receiving an update for a queued data packet.

For enqueue events, the connection scheduler can receive a data packet. The scheduler can add a pointer of the data packet into a corresponding packet type queue. Head and tail pointers for that queue can be updated. The data packets can correspond to upper layer protocol (ULP) requests or received packets (such as push grant) that require sending a data packet out on the network, as examples. If the data packet passes scheduling eligibility checks, then the connection scheduler can push a connection ID of the data packet into a corresponding scheduling queue or can set a corresponding bit in a scheduling bitmap.

For dequeue events, a quality of service (QoS) arbiter of the connection scheduler can select a connection queue to be scheduled. The connection scheduler can pop the data packet at the head of the selected connection queue and can read metadata of the popped data packet from the state of the popped data packet. The connection scheduler can send the popped data packet for transmission, such as through a packet transmission interface. If the next data packet in the selected connection queue passes scheduling eligibility checks, then the connection scheduler can push that data packet's connection ID into a corresponding scheduling queue or can set a corresponding bit in a scheduling bitmap.

For update events, the connection scheduler can receive an update event. The connection scheduler can update a connection state for a corresponding connection based on the update event. These updates can include acknowledgement packets, congestion windows (Cwnd) updates, or base sequence number (BSN) updates for a connection, as examples. If after a connection state update, new data packets can pass scheduling eligibility checks, then the connection scheduler can push the new data packets into a corresponding scheduling queue or can set a corresponding bit in a scheduling bitmap. The scheduling queues/bitmap can support multiple pushes/bits from a single event, as update events can result in multiple data packets being eligible for scheduling.

The connection scheduler includes a connection queue that can use a linked list data structure. The connection queue can be structured as a number of linked lists per connection to honor ordering requirements while preventing head-of-line blocking due to data packet gating requirements. The total number of connections in the connection queue can correspond to the number of active connections supported multiplied by the number of linked lists. Maintaining separate lists for different transaction types can allow for increasing performance.

The connection scheduler further includes eligibility checks. To respond to network fabric congestion and target resources being full, network congestion control can use separate definitions for network congestion window (fCwnd) and end-node congestion window (nCwnd). To meet the ordering and packet gating requirements, the connection scheduler can include a number of eligibility checks for each packet type before the data packets are pushed into a corresponding arbitration snapshot. For push requests and pull requests, eligibility checks can include checking the fCwnd and the nCwnd. For push grants, eligibility checks can include checking the fCwnd. For push unsolicited data, eligibility checks can include checking the fCwnd and the nCwnd as well as checking the RSN against pull requests. For push solicited data, eligibility checks can include checking the fCwnd and checking whether a push grant is received. For pull response, eligibility checks can include checking fCwnd.

The connection scheduler can further include solicitation checks for push requests, pull requests, and push grant packets to be transmitted. The solicitation checks can include a solicitation window check to limit outstanding solicitation buffer space.

The solicitation checks can further include solicitation rate limiters for controlling receiver bandwidth of incoming solicited pull data packets and/or push data packets as well as controlling transmission bandwidth of pushed solicited data.

The solicitation rate limiters can include a rate counter that increments at a configurable rate and max value that is configurable as well. The max value can limit the number of packets serviced in a burst. A data packet can only be scheduled when the rate counter is greater than zero.

The connection scheduler can also include scheduling queues that can use a linked list data structure. The number of scheduling queues can be determined by a mapping of host device and traffic class to queues. The connection scheduler can push an entry into the scheduling queue when a new packet is queued into the scheduler, the packet passes eligibility checks, and the connection ID is not already present in the corresponding scheduling queue. The connection scheduler can also push an entry into the scheduling queue when a packet is dequeued and the packet passes eligibility checks. The connection scheduler can further push an entry into the scheduling queue when an update event is processed, and one or more packets become eligible for scheduling.

The solicitation window checks can be performed after the scheduling queue such that only eligible packet type queues can participate in the arbitration process performed by the QoS arbiter. The QoS arbiter can pop an entry from the queue that wins the arbitration. One pop can occur every cycle.

The QoS arbiter can include a scheduling queue (SQ) selector configured to select the next scheduling queue to service. The SQ selector can be configured to select the next SQ based on a priority-level or a weight of the SQ and each SQ can be rate limited. A SQ assigned to a higher priority level can be serviced ahead of a SQ assigned to a lower priority level. SQs not assigned a priority level can participate in a weighted round robin (WRR) scheduler.

The QoS arbiter can include a plurality of packet selectors for each SQ that use a weighted round robin scheme, similar to the SQ selector, for selecting a packet from a SQ for transmission.

The QoS arbiter can include a rate limiter for each SQ. The rate limiter can include a counter with increments at a configurable rate. When the counter is greater than or equal to the size of the packet, the packet is allowed to be selected (either via a priority selector or weight round robin selector).

Figure 1:
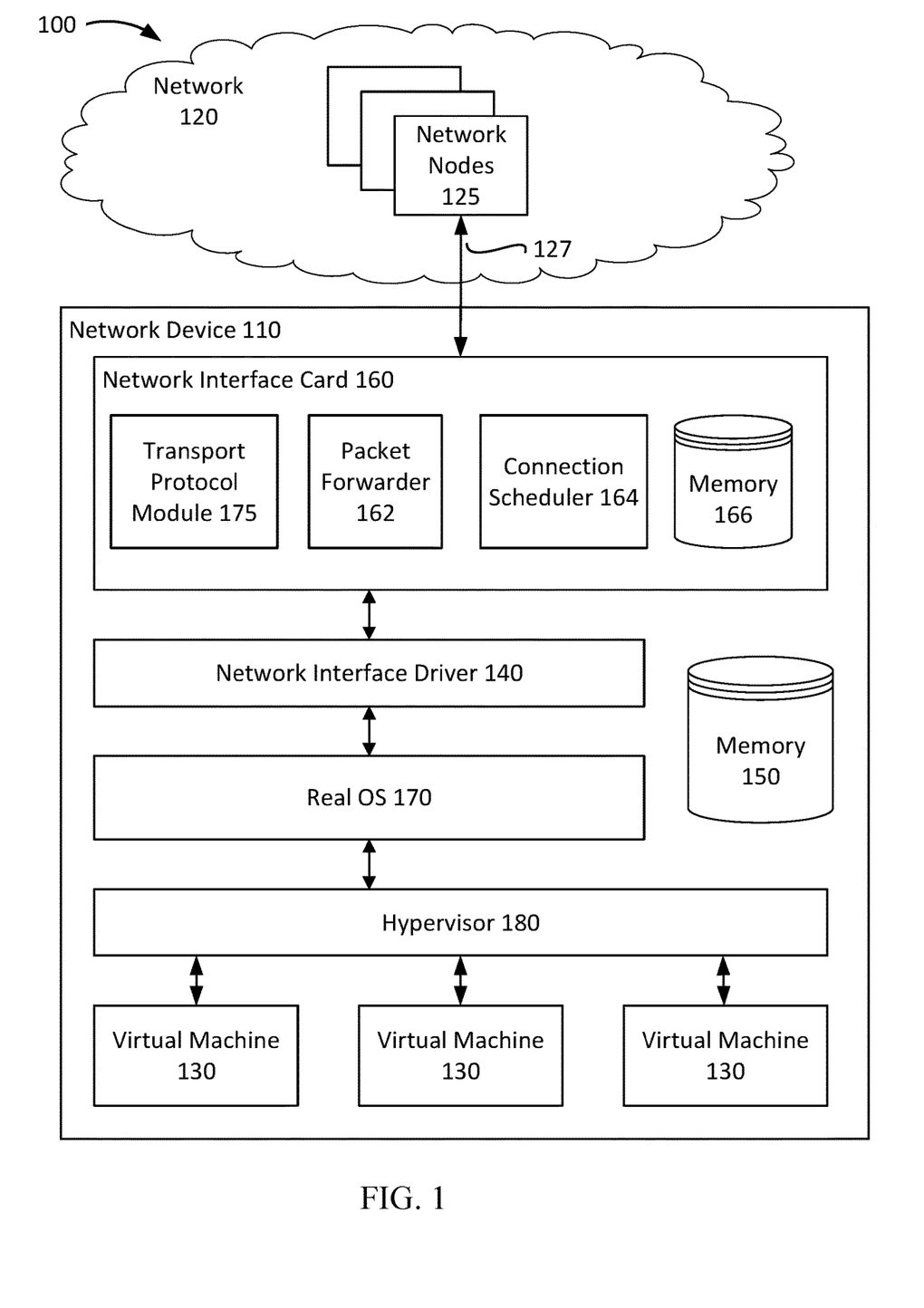
FIG. 1 depicts a block diagram of an example network environment with a network device according to aspects of the disclosure.

FIG. 1 depicts a block diagram of an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. The network can be public, private, or a combination of public and private. In general, the network 120 can be used to convey information between computing devices; for example, network nodes 125, and the network device 110.

The network device 110 can be a host device or server executing one or more virtual machines 130 on one or more processors of the network device 110. The network device 110 can include a network interface driver 140, a memory 150, a network interface card 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Data packets can be routed within one of the virtual networks overlaying the physical network using a system of data packet encapsulation. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. The memory 150 can include a high bandwidth memory (HBM), a dynamic random access memory (DRAM), a synchronous dynamic random access memory (SDRAM), a static random access memory (SRAM), and/or a flash memory, as examples. The memory 150 can store computer executable instructions of a transport protocol module 175, such as a transmission control protocol (TCP) module or the TCP layer of a network stack, to be executed on a processor of the network device 110. While shown in the network interface card 160, the transport protocol module 175 can also be included in the real OS. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver 140 can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a UDP module, RDP module, RUDP module, or a DCCP module. While not shown, the network interface driver 140 can be included as a portion of the network interface card 160.

The network interface card 160 can be configured to transfer data packets over a network protocol, such as a layer 2 protocol. The network interface card 160 can include a packet forwarder 162, a connection scheduler 164, and a memory 166.

The memory 166 can store data and/or computer executable instructions related to the operation and use of the network interface card 160. For example, the memory 166 can store connection queues and scheduling queues as well as instructions related to eligibility checks and solicitation checks. The memory 166 can include a SRAM, HBM, DRAM, SDRAM, and/or a flash memory, as examples.

The packet forwarder 162 can be implemented in an application-specific integrated circuit (ASIC) or as software executing on a microprocessor. The packet forwarder 162 can receive data packets for transmission from the virtual machines 130 and route them to one or more destination virtual machines executing on remote network devices. The packet forwarder 162 can also perform functions that allow the network interface card 160 to act as a destination for data packets received over the links 127. For example, the packet forwarder 162 can receive a data packet over one of the lines 127, decapsulate the data packet, and forward the data packet to one or more destination virtual machines 130 executing on the network device 110. The packet forwarder 162 can transmit and receive data packets based on the connection entries stored in the cache 166. Each transmission or reception of a data packet can correspond to deallocation or allocation of the memory 150, respectively.

The connection scheduler 164 can be implemented in an application-specific integrated circuit (ASIC) or as software executing on a microprocessor. The connection scheduler 164 can support scheduling a large number of connections at a high rate through connection queues, scheduling queues, and a quality of service (QoS) arbiter. The connection scheduler 164 can further include eligibility and solicitation checks when scheduling the connections. The connection scheduler 164 can handle enqueue events for receiving data packets, dequeue events for transmitting data packets, and update events for modifying data packets.

Figure 2:
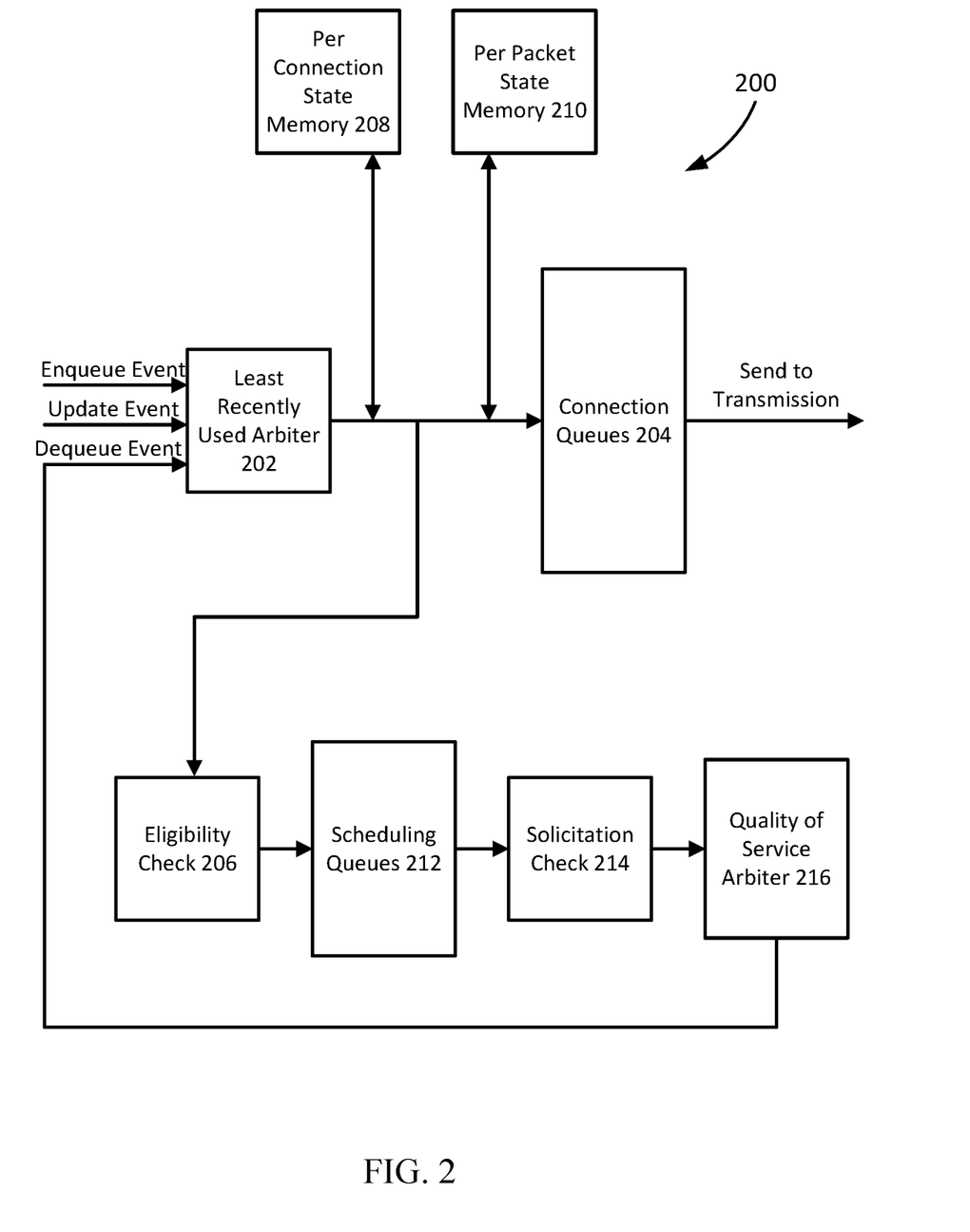
FIG. 2 depicts a block diagram of an example connection scheduler for scheduling connections according to aspects of the disclosure.

FIG. 2 depicts a block diagram of an example connection scheduler 200 for scheduling connections. The connection scheduler 200 can correspond to the connection scheduler 164 as depicted in FIG. 1.

The connection scheduler 200 can include a least recently used arbiter 202 for receiving enqueue events, update events, and dequeue events. An enqueue event can correspond to the connection scheduler receiving a new data packet to be queued. A dequeue event can correspond to a queued data packet being removed from the queue to be scheduled for transmission. An update event can correspond to the connection scheduler receiving an update for a queued data packet.

The least recently used arbiter 202 can determine which received event the connection scheduler 200 should process next. For instance, the least recently used arbiter 202 can determine which received event was received first or has been waiting for processing the longest, based on timestamps in metadata of the events. Based on the decision from the least recently used arbiter 202, the events are either sent to one or more connection queues 204 or an eligibility check module 206.

The connection scheduler 200 can include the connection queues 204 structured as a plurality of linked lists per connection. Structuring the connection queues 204 as linked lists per connection can honor ordering requirements while preventing head-of-line blocking due to data packet gating requirements. For ordered connections, ordering requirements can include ensuring request sequence number (RSN) and packet sequence number (PSN) relative ordering within each sliding window. For unordered connections, ordering requirements can include ensuring PSN relative ordering within each sliding window. Gating requirements can include congestion control and solicitation windows depending on the data packet type.

The total number of connection queues 204 can correspond to the number of supported active connections multiplied by the number of linked lists. For example, if 64k active connections are supported for 5 linked lists, the total number of connection queues can correspond to 320k connections.

Example transaction type based linked lists for each connection can include an ordered push requests list, unordered push requests list, push grant list, push data list, and pull data list. An ordered push requests list can include solicited push requests, phantom unsolicited requests, and pull requests for ordered connections and pull requests for unordered connections. An unordered push requests list can include solicited push requests for unordered connections. A push grant list can include push grants for ordered connections and unordered connections. A push data list can include solicited and unsolicited push data for ordered connections and unordered connections. A pull data list can include pull data for ordered connections and unordered connections.

Maintaining linked lists for different transaction types can increase performance. The connection scheduler 200 can maintain ordering independently within initiator transactions or target transactions without maintaining a combined ordering for all initiator and target transactions. Initiator transactions can correspond to transactions related to sending a request, such as a write or a read request. Target transactions can correspond to transactions related to receiving a request, such as receiving a write or read request and committing the write or read request. Initiator pull requests and target push grants can be blocked independent of initiator pushes. Further, maintaining linked lists allows for separation between initiator and target traffic regardless of the number of active connections. Arbitrating first among transaction types allows for the connection scheduler 200 to respond with increasing performance to remote requesters, whose resources can be held due to pending transactions.

Based on states of connections and states of packets, respectively stored in per connection state memory 208 and per packet state memory 210, the connection scheduler 200 can determine which packet in the connection queues 204 to send to transmission. For example, states of connections stored in the per connection state memory 208 can include network congestion windows and end node congestion windows and state of packets stored in the per packet state memory 210 can include request sequence numbers.

The connection scheduler 200 can further include eligibility checks performed via the eligibility check module 206. The eligibility check module 206 can perform eligibility checks related to network congestion control, such as ordering and packet gating requirements.

Network congestion control can use separate definitions for network congestion window (fCwnd) and end-node congestion window (nCwnd). Network congestion window can be defined as a number of transmission packets that the connection scheduler can have outstanding per sliding window. End-node congestion window can be defined as a number of ULP requests that, as an initiator, the connection scheduler 200 can have outstanding per sliding window.

To meet the ordering and packet gating requirements, the eligibility check module 206 can include a number of eligibility checks for each packet type before the data packets are pushed to a corresponding scheduling queue 212. For push requests and pull requests, eligibility checks can include checking the fCwnd and the nCwnd. For push grants, eligibility checks can include checking the fCwnd. For push unsolicited data, eligibility checks can include checking the fCwnd and the nCwnd as well as checking the RSN against pull requests. For push solicited data, eligibility checks can include checking the fCwnd and checking whether a push grant is received. For pull response, eligibility checks can include checking fCwnd. Checking the fCwnd and the nCwnd can include comparing the number of outstanding data packets in a corresponding request or data window with the fCwnd/nCwnd value, where data packets can be eligible to be scheduled when the number of outstanding data packets are less than the fCwnd/nCwnd value. Checking the RSN against pull requests can include comparing a RSN of a push unsolicited data packet against a RSN of a head-of-line pull request packet, where the push unsolicited data can be eligible for scheduling when the RSN of the push unsolicited data packet is less than the RSN of the head-of-line pull request packet. The RSN for both push unsolicited data and pull requests can be stored in the scheduler state. If a connection does not pass the eligibility check, the data packets of that connection are not picked for scheduling and wait to become eligible.

Data packet transmission and retransmission can be based on the following example eligibility checks. For pull requests and push requests in a request sliding window, the PSN should be less than a BSN in the request sliding window plus the network congestion window and the number of outstanding requests should be less than the end-node congestion window. For push unsolicited data in a data sliding window, the PSN should be less than a BSN in the data sliding window plus network congestion window and the number of outstanding requests should be less than the end node congestion window. For pull data, push grant, and push solicited data in a data sliding window, the PSN should be less than a BSN in the data sliding window plus the network congestion window.

For an initial transmission, the eligibility check module 206 can maintain a number of outstanding request state variables per sliding window. The count for number of outstanding requests can be incremented when the connection scheduler 200 initially schedules a pull request, push request, or push unsolicited data, and can be decremented when a corresponding pull request is acknowledged or a corresponding push data is acknowledged. For retransmission, the eligibility check module 206 can dynamically determine a number of outstanding requests based on retransmission packet types. For example, the count for number of outstanding requests can be incremented only when the connection scheduler 200 schedules a push unsolicited data.

Figure 3:
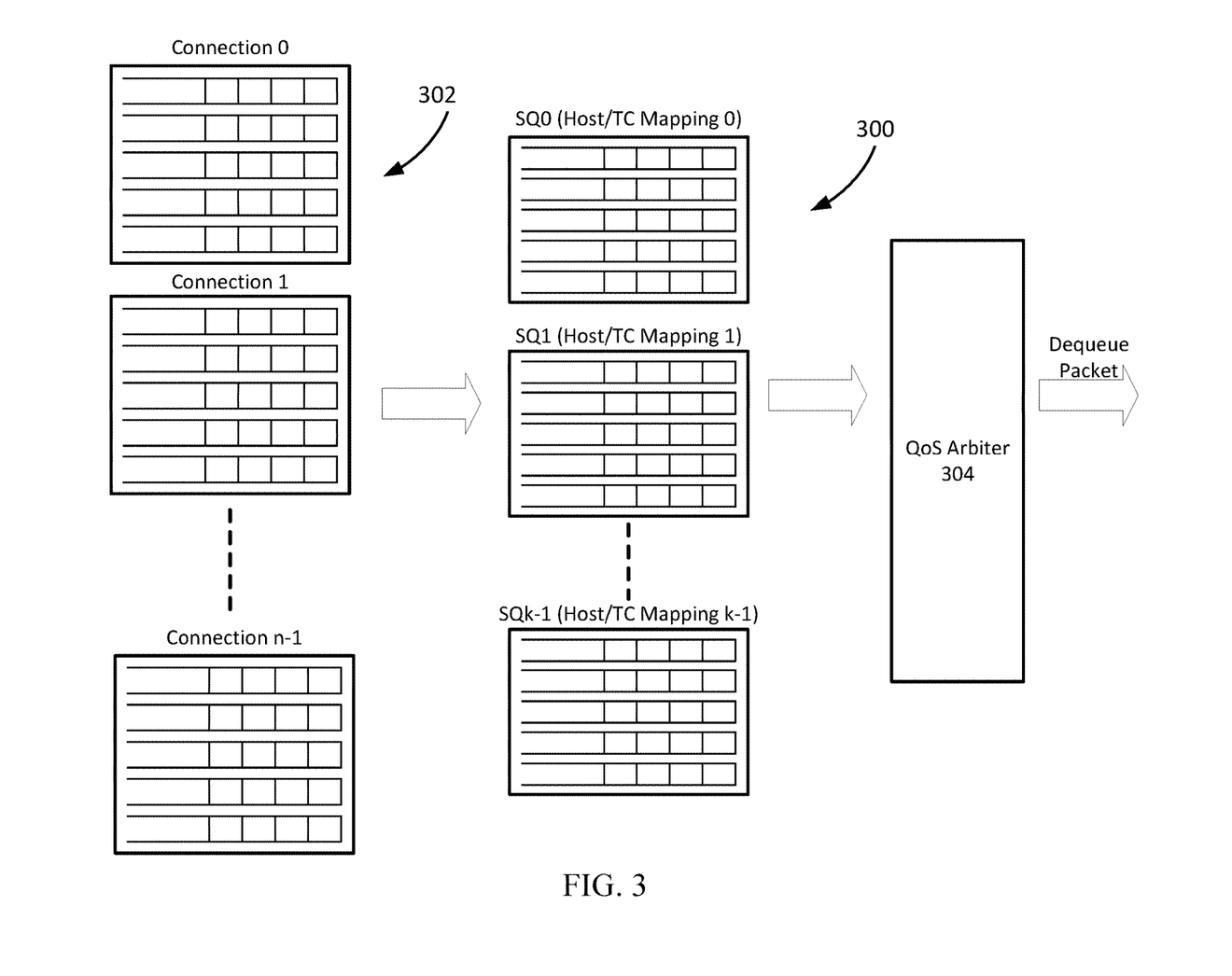
FIG. 3 depicts a block diagram of example scheduling queues according to aspects of the disclosure.

Based on passing the eligibility check, connections can be placed in scheduling queues 212 of the connection scheduler 200. The scheduling queues 212 can be structured as a plurality of linked lists. FIG. 3 depicts a block diagram of example scheduling queues 300. The scheduling queues 300 can correspond to the scheduling queues 212 as depicted in FIG. 2. A plurality of connections 302 can be positioned in the scheduling queues 300 based on the linked list data structure. A quality of service (QoS) arbiter 304 can determine which scheduling queue 300 to select and which connection within the selected scheduling queue 300 to select for dequeuing a data packet, to be described further below.

The number of scheduling queues 300 can be determined by a mapping of host device and traffic class to queues. The mapping can be a compressed sparse row (CSR) mapping. The host device can correspond to a server connected to a network interface card for scheduling the connections 302, such as the network interface card 160 as depicted in FIG. 1. The traffic class can correspond to a categorization for the connections 302, for example based on a port number or protocol. As an example, the scheduling queues 300 can support 16 mappings as well as 5 packet queues for various packet types in each of the queues, such as pull requests, solicited push requests, push grants, solicited and unsolicited push data, and pull data. Push and pull requests can be separated into different scheduling queues 300 to enable independent solicitation rate limiters to push or pull requests and avoid head of line blocking issues.

Referring back to FIG. 2, the connection scheduler 200 can push entries into the scheduling queues 212 for enqueue events, dequeue events, and update events. For enqueue events, the connection scheduler 200 can push an entry into the scheduling queues 212 when a new packet passes the eligibility checks and a connection ID of the new data packet is not already present in a corresponding scheduling queue 212. For dequeue events, the connection scheduler 200 can push an entry into the scheduling queues 212 when a packet to be transmitted passes eligibility checks. For update events, the connection scheduler 200 can push an entry into the scheduling queues 212 when one or more packets become eligible for scheduling after processing the update event.

The connection scheduler 200 can further include solicitation checks performed via a solicitation check module 214. The solicitation check module 214 can perform the solicitation checks for push requests, pull requests, and push grant packets after the scheduling queues 212 such that only eligible packet type queues can participate in the arbitration process performed by a QoS arbiter 216.

The solicitation check module 214 can perform a solicitation window check to limit outstanding solicitation buffer space. The solicitation check module 214 can keep track of a total solicited bytes, referred to as an inflight count. For each new pull request and push grant, the solicitation check module 214 can add the bytes associated with the new request to the current total inflight count to compute a temporary incremented inflight count. The solicitation check module 214 can compare the incremented flight count with a solicitation window multiplied by a scaling factor alpha. The scaling factor alpha can scale the window up or down. If the incremented flight count is less than the scaled solicitation window, then the new request can be performed, and the solicitation check module 214 can set the inflight count to the incremented value. If a packet type does not pass the solicitation check, that packet type is not picked for scheduling and must wait until it is eligible.

The solicitation check module 214 can further include solicitation rate limiters to control receiver bandwidth and/or transmission bandwidth. The solicitation rate limiters can control receiver bandwidth of incoming solicited pull data packets and/or push data packets for pull requests and push grants, respectively. The solicitation rate limiters can control transmission bandwidth of pushed solicited data by pacing push requests based on a size of the solicited push data packet for push requests.

The solicitation rate limiters can include a rate counter that increments at a configurable rate and max value that is configurable as well. The rate counter can start at 0 and increment at the configured rate. Once the rate counter reaches the configured max value, the rate counter can stop incrementing. The max value can limit the number of packets serviced in a burst. A data packet can only be scheduled when the rate counter is greater than zero. When a pull request or push grant is scheduled by the connection scheduler 200, the number of solicited bytes is subtracted from the rate counter. The counter can go negative to keep track of extra bytes solicited.

Figure 4:
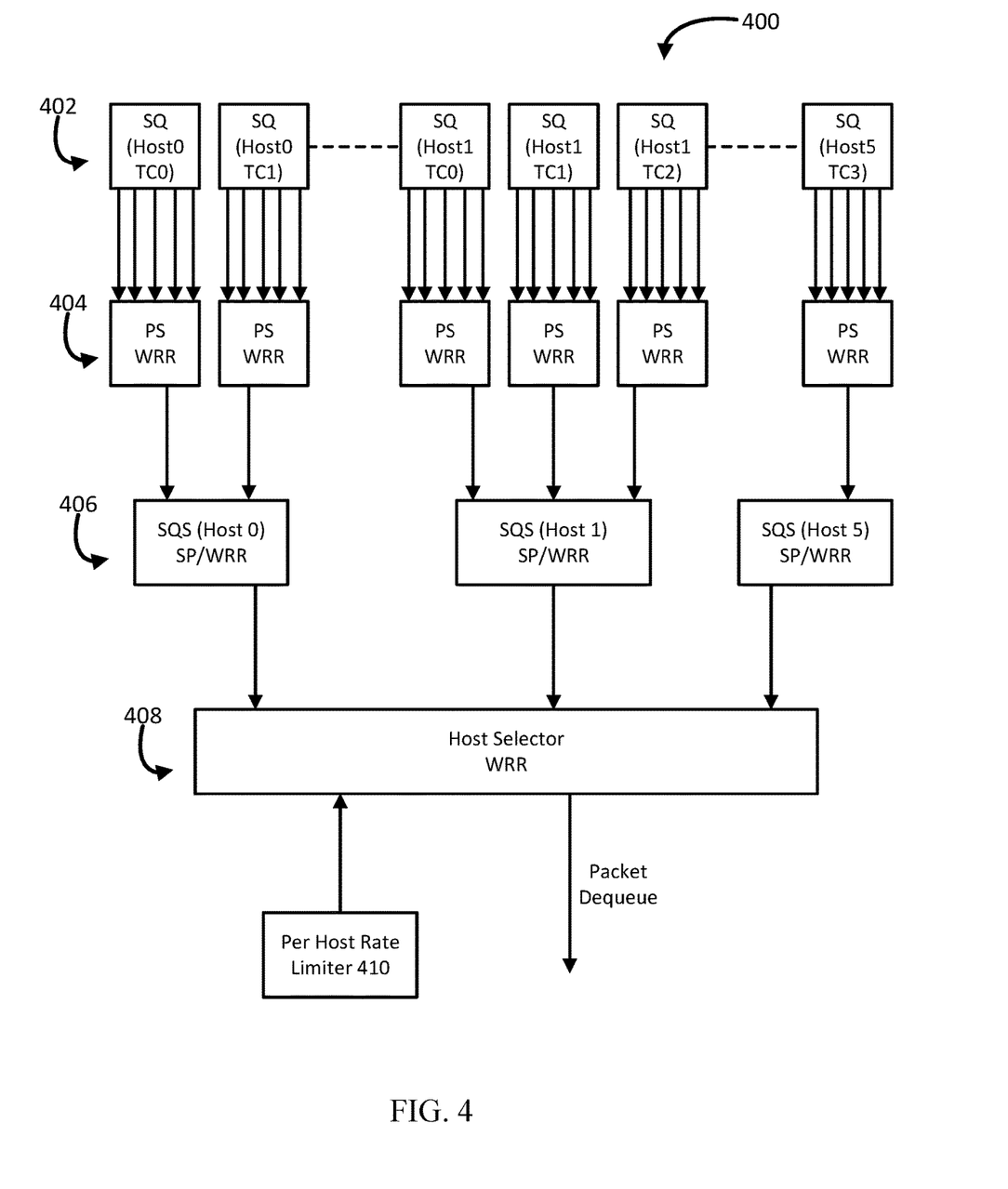
FIG. 4 depicts a block diagram of an example quality of service arbiter for a plurality of scheduling queues according to aspects of the disclosure.

After solicitation checks are passed, the connection scheduler 200 can further include the QoS arbiter 216 to determine which scheduling queue to select and which connection within the selected scheduling queue to select for dequeue events. The QoS arbiter 216 can pop an entry that wins arbitration for dequeuing from the scheduling queues. One pop can occur per cycle. FIG. 4 depicts a block diagram of example QoS arbiter 400 for a plurality of scheduling queues 402. The QoS arbiter 400 can correspond to the QoS arbiter 216 as depicted in FIG. 2.

The QoS arbiter 400 can include a plurality of packet selectors 404 for each scheduling queue 402 configured to select a packet from each scheduling queue 402 for transmission using a weighted round robin scheme.

For the weighted round robin scheme, each packet selector 404 can have a credit counter, initialized as a configurable weight. Each time a packet is selected, the packet size is subtracted from the credit counter. A packet can be eligible to be selected if the credit counter is greater than or equal to 0. Selection between all packets that have enough credits can be done on a round robin basis.

If all packets have a negative credit counter, then one is elected on a round robin basis. The credit counters for all packet selectors 404 are reinitialized when a packet is selected and its credit counter is negative. If a credit counter is negative when the credit counter is reinitialized, the configurable weight corresponding to that credit counter is added to its current value. If a credit counter is positive when it is reinitialized, the programmed weight is again added to the counter. A max credit value can be provided to cap the amount of credits that a packet selector can accumulate.

Once packets are selected from each scheduling queue 402, the QoS arbiter 400 can further include a plurality of scheduling queue selectors 406 configured to select the next scheduling queue 402 to service. The scheduling queue selectors 406 can be configured to select the next scheduling queue 40 based on a priority level and/or a weight of the scheduling queue 402. Each scheduling queue 402 can also be rated limited.

The scheduling queue selectors 406 can be configured to select scheduling queues 402 assigned to a higher priority level before scheduling queues 402 assigned to a lower priority. For example, 8 levels of priority can be available, where each priority level can have one or more scheduling queues assigned to it. The highest priority can be 0 and the lowest can be 7. Therefore, a scheduling queue assigned to a priority level of 3 can be serviced ahead of a scheduling queue assigned to a priority level of 5.

The scheduling queue selectors 406 can use a weighted round robin scheme for scheduling queues that are not assigned a priority level or for scheduling queues that are assigned the same priority level. Each scheduling queue 402 can have a credit counter, initialized as a configurable weight. Each time a scheduling queue 402 is selected, the packet size is subtracted from the credit counter. A scheduling queue 402 can be eligible to be selected if the credit counter is greater than or equal to 0. Selection between all scheduling queues 402 that have enough credits can be done on a round robin basis.

If all scheduling queues that have packets pending have a negative credit counter, then one is elected on a round robin basis. The credit counters for all scheduling queues 402 are reinitialized when a scheduling queue 402 is selected and its credit counter is negative. If a credit counter is negative when the credit counter is reinitialized, the configurable weight corresponding to that credit counter is added to its current value. For example, if the credit counter is −5 when it was reinitialized, then the credit counter is set to its configurable weight of −5. If a credit counter is positive when it is reinitialized, the programmed weight is again added to the counter. A max credit value can be provided to cap the amount of credits that a scheduling queue 402 can accumulate.

Once scheduling queues 402 are selected from each scheduling queue selector 406, the QoS arbiter 400 can further include a host selector 408 configured to select the next host device to service using a weighted round robin scheme.

For the weighted round robin scheme, each host selector 408 can have a credit counter, initialized as a configurable weight. Each time a host device is selected, the packet size is subtracted from the credit counter. A host device can be eligible to be selected if the credit counter is greater than or equal to 0. Selection between all host devices that have enough credits can be done on a round robin basis.

If all host devices have a negative credit counter, then one is elected on a round robin basis. The credit counters for all host selectors 408 are reinitialized when a packet is selected and its credit counter is negative. If a credit counter is negative when the credit counter is reinitialized, the configurable weight corresponding to that credit counter is added to its current value. If a credit counter is positive when it is reinitialized, the programmed weight is again added to the counter. A max credit value can be provided to cap the amount of credits that a host selector 408 can accumulate.

Once the host device is selected, the selected packet corresponding to the selected scheduling queue and selected host device can be dequeued for transmission.

The QoS arbiter 40 can include a rate limiter 410 for each host device. Each rate limiter 410 can include a counter with increments at a configurable rate. The increment time period should be the same for all scheduling queues 402, but the increment amount can be configurable per scheduling queue 402. A configurable max value can be included per scheduling queue 402 as well.

The counter can start at 0 and can increment at the configurable rate. When the counter is greater than or equal to the size of a packet from a scheduling queue 402, the scheduling queue 402 is allowed to be selected. When a scheduling queue 402 is selected, a credit is subtracted from the counter. Once the counter reaches the configurable max value, the counter can stop incrementing. The max value can limit the number of packets that can be serviced in a burst. The rate limiters 410 can be enabled or disabled per scheduling queue 402. The rate limit can be a hard limit, such that once a scheduling queue 402 is out of rate credits, it will not be allowed to send a packet even if there are no other scheduling queues 402 available to be serviced.

Figure 5:
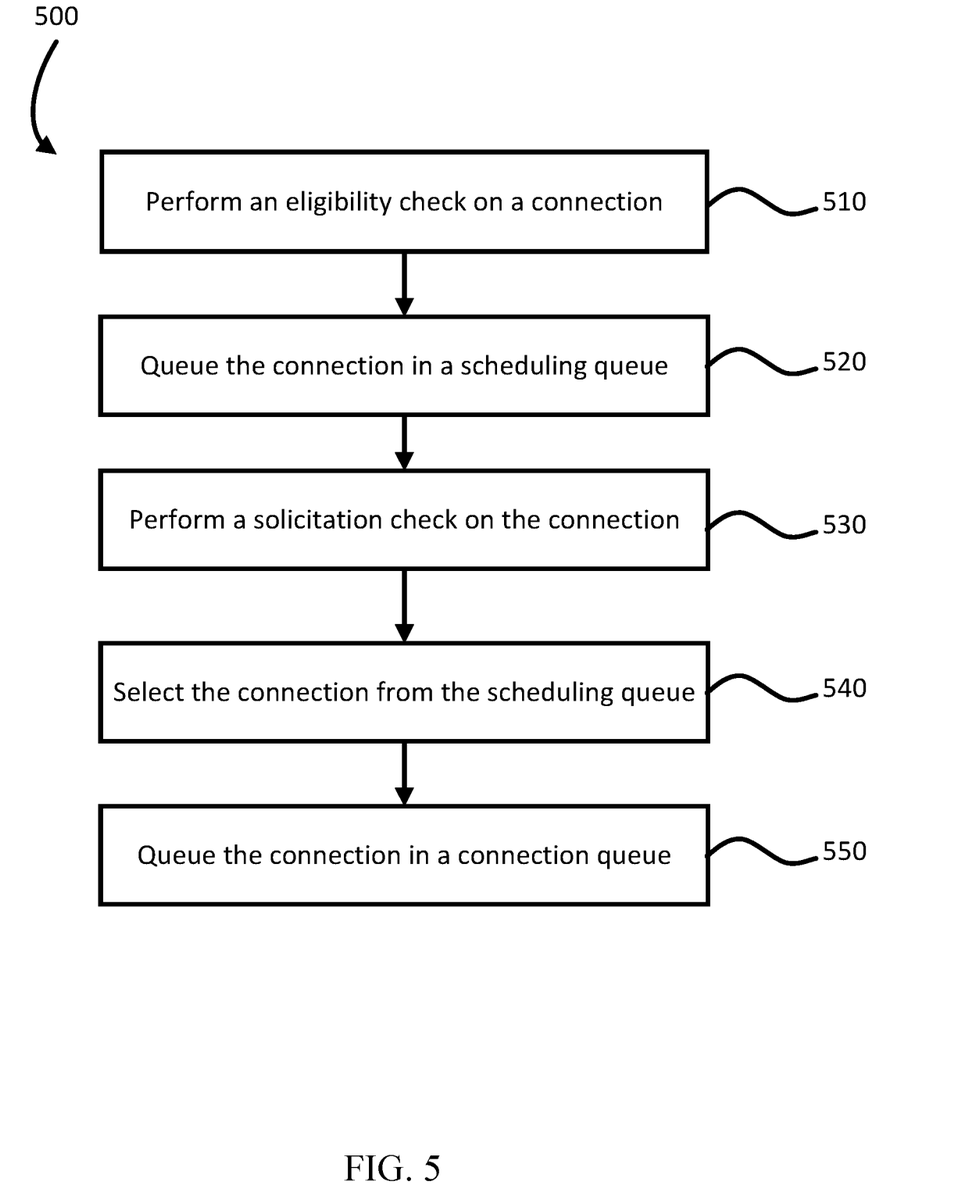
FIG. 5 depicts a flow diagram of an example process for scheduling connections according to aspects of the disclosure.

FIG. 5 depicts a flow diagram of an example process 500 for scheduling connections involving data packet transmission, reception, and/or modification. The example process 500 can be performed on a system of one or more processors in one or more locations, such as the connection scheduler 200 as depicted in FIG. 2.

As shown in block 510, the connection scheduler 200 can perform an eligibility check on a connection. The eligibility check can include determining the connection is within congestion windows based on a transaction type of the connection to meet ordering and packet gating requirements.

For example, when the transaction type is a push request or pull request, eligibility checks can include checking network congestion windows and end-node congestion windows. When the transaction type is a push grant, eligibility checks can include checking the network congestion window. When the transaction type is a push unsolicited data, eligibility checks can include checking the network congestion windows and end-node congestion windows as well as checking request sequence numbers against pull requests. When the transaction type is a push solicited data, eligibility checks can include checking the network congestion window and checking whether a push grant is received. When the transaction type is a pull response, eligibility checks can include checking the network congestion window.

As shown in block 520, the connection scheduler 200 can queue the connection in a scheduling queue of a plurality of scheduling queues based on the transaction type when the connection passes the eligibility check. The scheduling queues can use a linked list data structure. The number of scheduling queues can be determined by a mapping of host device and traffic class to the scheduling queues.

As shown in block 530, the connection scheduler 200 can perform a solicitation check on the connection. The solicitation check can include determining whether an inflight count based on the connection is within a solicitation window to limit outstanding solicitation buffer space. Whenever the inflight count is incremented based on new requests, the solicitation check can compare the incremented flight count with a solicitation window multiplied by a scaling factor.

As shown in block 540, the connection scheduler 200 can select the connection from the scheduling queue based on a decision from a QoS arbiter. The QoS arbiter can include a plurality of packet selectors for selecting a connection from each scheduling queue using a weighted round robin scheme. The QoS arbiter can further include a plurality of scheduling queue selectors for selecting a scheduling queue that includes the selected connection using a priority and/or weighted round robin scheme. The QoS arbiter can also include a host selector for selecting a host device that includes the selected scheduling queue using a weighted round robin scheme.

As shown in block 550, the connection scheduler 200 can queue the connection in a connection queue of a plurality of connection queues based on the transaction type of the connection. The connection queues can use a linked list data structure. The total number of connection queues can correspond to the number of supported active connections multiplied by the number of linked lists.

Figure 6:
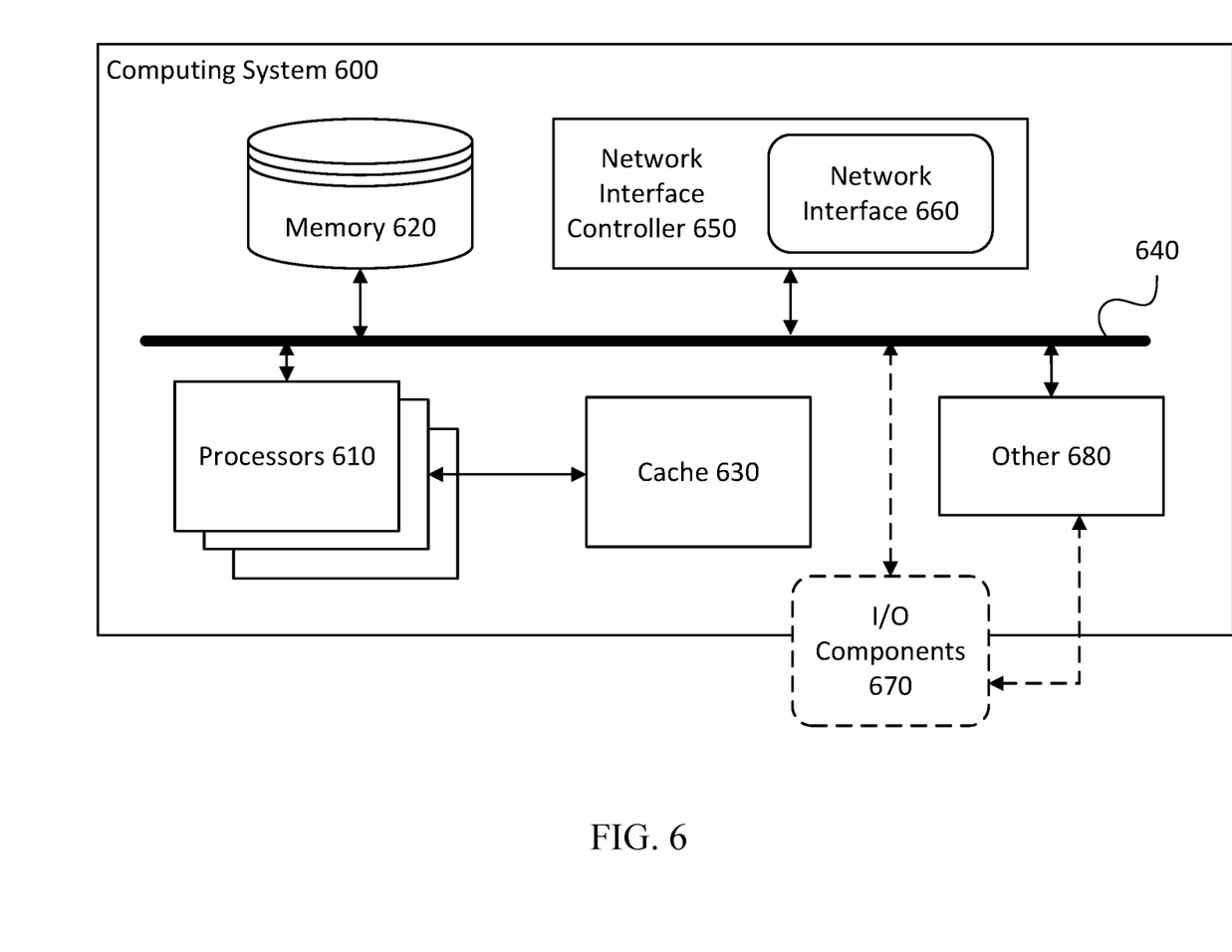
FIG. 6 depicts an example computing system according to aspects of the disclosure.

FIG. 6 depicts an example computing system 600, which can be configured as the network device 110 of FIG. 1. The computing system 600 can include one or more processors 610 in communication with memory 620, at least one network interface controller 650 with network interface port 660 for connection to a network, input/output (I/O) components 670, and other components 680. The processors 610 can be in communication with the memory 620, network interface controller 650, I/O components 670, and other components 680 via a bus 640, as an example. The processors 610 can incorporate, or are connected to, cache memory 630. In some instances, instructions are read from memory 620 into cache memory 630 and executed by the processors 610 from cache memory 630.

The processors 610 can be any logic circuitry that executes instructions fetched from the memory 620 or cache 630. The processors 610 can be microprocessor units or special purpose processors. The computing device 600 can be based on any processor, or set of processors, capable of operating as described herein. The processors 610 can be single core or multi-core processors. The processors 610 can be multiple distinct processors. The processors 610 can be implemented as circuitry on one or more chips.

The memory 620 can be any device suitable for storing computer readable data. The memory 620 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 600 can have any number of memory devices 620.

The cache memory 630 can be a form of computer memory placed in close proximity to the processors 610 for fast access times. The cache memory 630 can be part of, or on the same chip as, the processors 610. There can be multiple levels of cache 630, e.g., level 2 and level 3 cache layers.

The network interface controller 650 can manage data exchanges via the network interface 660. The network interface controller 650 can handle the physical and data link layers of the open systems interconnection (OSI) model for network communication. Some of the tasks of the network interface controller 650 can be handled by one or more of the processors 610. The network interface controller 650 can be incorporated into the processors 610, such as circuitry on the same chip.

The computing system 600 can have multiple network interfaces 660 controlled by a single controller 650 or multiple network interface controllers 650. Each network interface 660 can be a connection point for a physical network link, e.g., a cat-5 Ethernet link. The network interface controller 650 can support wireless network connections and an interface port 660 can be a wireless, e.g., radio, receiver/transmitter. The network interface controller 650 can implement one or more network protocols such as Ethernet. The computing system 600 can exchange data with other computing systems via physical or wireless links through a network interface 660. The network interface 660 can link directly to another device or to another device via an intermediary device, e.g., a network device such as a hub, a bridge, a switch, or a router, connecting the computing device 600 to a data network such as the Internet.

The computing system 600 can include, or provide interfaces for, one or more input or output (I/O) components 670. Input devices can include keyboards, microphones, touch screens, sensors, and pointing devices, such as a mouse or trackball, as examples. Output devices can include video displays, speakers, and printers, as examples.

Other components 680 can include an I/O interface, external serial device ports, and any additional co-processors. For example, the computing system 600 may include an interface, e.g., a universal serial bus (USB) interface, for connecting input devices, output devices, or additional memory devices, e.g., portable flash drive or external media drive. The computing device 600 can include an additional co-processor, such as a math co-processor to assist the processors 610 with high precision or complex calculations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for scheduling connections related to data packets, the method comprising:
   performing, with one or more processors, an eligibility check on a connection, the eligibility check comprising determining that the connection is within one or more congestion windows associated with a transaction type of the connection;
   queueing, with the one or more processors, the connection in a scheduling queue of a plurality of scheduling queues based on the transaction type of the connection, each scheduling queue of the plurality of scheduling queues being associated with a transaction type;
   selecting, with the one or more processors, the connection from the scheduling queue based on a quality of service (QoS) arbiter decision; and
   queueing, with one or more processors, the selected connection in a connection queue of a plurality of connection queues based on the transaction type of the selected connection, each connection queue of the plurality of connection queues being associated with a transaction type.

2. The method of claim 1, wherein the scheduling queues and the connection queues each comprise a plurality of linked lists, each linked list corresponding to a respective scheduling queue or connection queue.

3. The method of claim 2, wherein the plurality of linked lists of the scheduling queues and the plurality of linked lists of the connection queues each comprise linked lists for at least one of push requests, unordered push requests, push grants, push data, or pull data transaction types.

4. The method of claim 1, wherein the one or more congestion windows comprise a network congestion window and an end-node congestion window.

5. The method of claim 4, wherein passing the eligibility check comprises determining that a number of outstanding requests is less than the end-node congestion window.

6. The method of claim 4, wherein passing the eligibility check comprises determining that a packet sequence number is less than a base sequence number plus the network congestion window.

7. The method of claim 1, further comprising performing, with the one or more processors, a solicitation check on the connection, the solicitation check comprising determining that an inflight count based on the connection is within a solicitation window.

8. The method of claim 7, wherein passing the solicitation check further comprises determining that a rate counter is greater than a threshold.

9. The method of claim 1, wherein selecting the connection from the scheduling queue further comprises selecting the scheduling queue based on at least one of a priority level or a weight of the scheduling queue.

10. The method of claim 1, wherein selecting the connection from the scheduling queue is based on a weight of the connection.

11. A system comprising:
   one or more processors; and
   one or more storage devices coupled to the one or more processors and storing instructions that, when executed by the one or more processors, cause the one or more processors to perform operations for scheduling connections related to data packets, the operations comprising:
      performing an eligibility check on a connection, the eligibility check comprising determining that the connection is within one or more congestion windows associated with a transaction type of the connection;
      queueing the connection in a scheduling queue of a plurality of scheduling queues based on the transaction type of the connection, each scheduling queue of the plurality of scheduling queues being associated with a transaction type;
      selecting the connection from the scheduling queue based on a quality of service (QoS) arbiter decision; and
      queueing the selected connection in a connection queue of a plurality of connection queues based on the transaction type of the selected connection, each connection queue of the plurality of connection queues being associated with a transaction type.

12. The system of claim 11, wherein the scheduling queues and the connection queues each comprise a plurality of linked lists, each linked list corresponding to a respective scheduling queue or connection queue.

13. The system of claim 11, wherein:
   the one or more congestion windows comprise a network congestion window and an end-node congestion window;
   passing the eligibility check comprises determining that a number of outstanding requests is less than the end-node congestion window; and
   passing the eligibility check comprises determining that a packet sequence number is less than a base sequence number plus the network congestion window.

14. The system of claim 11, wherein the operations further comprise performing a solicitation check on the connection, the solicitation check comprising determining that an inflight count based on the connection is within a solicitation window.

15. The system of claim 11, wherein selecting the connection from the scheduling queue is based on a weight of the connection and further comprises selecting the scheduling queue based on at least one of a priority level or a weight of the scheduling queue.

16. A non-transitory computer readable medium for storing instructions that, when executed by one or more processors, cause the one or more processors to perform operations for scheduling connections related to data packets, the operations comprising:
   performing an eligibility check on a connection, the eligibility check comprising determining that the connection is within one or more congestion windows associated with a transaction type of the connection;
   queueing the connection in a scheduling queue of a plurality of scheduling queues based on the transaction type of the connection, each scheduling queue of the plurality of scheduling queues being associated with a transaction type;

selecting the connection from the scheduling queue based on a quality of service (QoS) arbiter decision; and queueing the selected connection in a connection queue of a plurality of connection queues based on the transaction type of the selected connection, each connection queue of the plurality of connection queues associated with a transaction type.

17. The non-transitory computer readable medium of claim 16, wherein the scheduling queues and the connection queues each comprise a plurality of linked lists, each linked list corresponding to a respective scheduling queue or connection queue.

18. The non-transitory computer readable medium of claim 16, wherein:

the one or more congestion windows comprise a network congestion window and an end-node congestion window;

passing the eligibility check comprises determining that a number of outstanding requests is less than the end-node congestion window; and passing the eligibility check comprises determining that a packet sequence number is less than a base sequence number plus the network congestion window.

19. The non-transitory computer readable medium of claim 16, wherein the operations further comprise performing a solicitation check on the connection, the solicitation check comprising determining that an inflight count based on the connection is within a solicitation window.

20. The non-transitory computer readable medium of claim 16, wherein selecting the connection from the scheduling queue is based on a weight of the connection and further comprises selecting the scheduling queue based on at least one of a priority level or a weight of the scheduling queue.

* * * * *